US006345591B1

United States Patent
Richmond (10) Patent No.: US 6,345,591 B1
(45) Date of Patent: Feb. 12, 2002

(54) ANIMAL CARRIER

(75) Inventor: Edward Richmond, North Hollywood, CA (US)

(73) Assignee: Amerlin, Inc., N. Hollywood, CA (US)

(*) Notice: Subject to any disclaimer, the term of this patent is extended or adjusted under 35 U.S.C. 154(b) by 0 days.

(21) Appl. No.: 09/437,802

(22) Filed: Nov. 10, 1999

(51) Int. Cl.⁷ .................................................. A01K 1/03

(52) U.S. Cl. ...................................... 119/497; 119/499

(58) Field of Search ................................. 119/496, 497, 119/498, 499, 795; 190/39, 107, 116, 117; 294/152

(56) References Cited

U.S. PATENT DOCUMENTS

| | | | | |
|---|---|---|---|---|
| 4,830,154 A | * | 5/1989 | Gerch et al. ............ | 190/107 X |
| 5,669,331 A | * | 9/1997 | Richmond ................. | 119/497 |
| 6,082,305 A | * | 7/2000 | Burns et al. ............... | 119/497 |
| 6,155,206 A | * | 12/2000 | Godshaw ................ | 119/496 X |

* cited by examiner

Primary Examiner—Robert P. Swiatek (74) Attorney, Agent, or Firm—Ellsworth R. Roston; Fulwider Patton, et al.

(57) ABSTRACT

A pet carrier, expandable to hold a pet and collapsible to suitcase size, includes a pair of platforms and first and second pairs of spaced walls. The first walls (e.g. front, rear) are pivotably attached at opposite ends to the platforms and are hinged at intermediate positions for collapsing or opening the carrier. The second walls (e.g. side) are pivotable toward an individual one of the platforms, with the platform as a fulcrum, to collapse the carrier and are pivotable toward the other platform to open the carrier. Resilient members at the bottom of the first walls releasably engage the second walls for maintaining the carrier open. The resilient members are constrained to provide for a pivotal movement of the second walls to the carrier's open relationship. Straps engage clasps on the top platform in different relationships providing for a manual transport of the carrier by the pet owner with (a) the carrier opened or collapsed and disposed at the owner's side near the owner's knees, (b) the carrier collapsed and disposed at the owner's side near the chest and the straps disposed over one shoulder and (c) the carrier collapsed and disposed against the owner's back and the straps disposed over the owner's shoulders. The straps may be decoupled from the carrier clasps and used as a leash. The straps may have casings at intermediate positions to provide comfort to the owner when the straps are disposed on the shoulder(s) or grasped by the owner's hand.

27 Claims, 10 Drawing Sheets

ANIMAL CARRIER

This invention relates to carriers for pets. More particularly, the invention relates to pet carriers which can be opened for holding the pet and which can be easily and quickly collapsed to suitcase size when not holding the pet and which can be easily and manually transported by the pet owner in the opened or closed relationships. The manual transport can be provided by straps which are coupled to the pet carrier and which are grasped by the pet owner and which can be decoupled from the pet carrier to provide leashes for walking the pet.

BACKGROUND OF THE INVENTION

There are millions of pets in the United States. This results from the prevalent belief that pets are good companions for children and provide good training for children in caring for others. It also results in part from the companionship which pets offer to single persons, to married couples and to persons of advanced age.

People in the United States travel often these days, either for personal pleasure or for business purposes. Such travelers frequently take their pets with them on these trips. Generally such travelers have to bring carriers or have to rent or purchase carriers from the airlines, railroads or buses to house their pets during the travel. It is expensive to rent or purchase such pet carriers. Furthermore, the purchased or rented carriers are not comfortable to the pets. If rented, the carriers have to be returned to the airline, the railroad or the bus operator at the end of the trip. If purchased, the carriers are generally not retained by the buyer at the end of the trip because they are bulky and inconvenient to store.

U.S. Pat. No. 3,048,147 issued to J. O. McKean on Aug. 7, 1962, for "Portable Collapsible Shipping Kennel For Animals" discloses an expandable and collapsible carrier for pets. However, the kennel lacks certain features which would cause the carrier to be adopted by pet owners. For example, the kennel does not provide a satisfactory arrangement for maintaining the kennel in an expanded (or open) relationship and for maintaining the kennel in a collapsed relationship.

U.S. Pat. No. 5,669,131 issued to Edward Richmond on Sep. 23, 1997 for an "Animal Carrier" provides a pet carrier which is easily operated manually between opened and collapsed relationships and which is easily and reliably maintained in the opened and collapsed relationships. Mr. Richmond is the sole inventor listed in U.S. Pat. No. 5,669,131 and has assigned this patent of record to a corporation owned and controlled by Mr. Richmond.

BRIEF DESCRIPTION OF THE PREFERRED EMBODIMENT

This invention provides a pet carrier which is similar in a number of details of construction to the pet carrier disclosed and claimed in U.S. Pat. No. 5,669,131. However, the pet carrier of this invention provides certain advantages over the prior art including the prior art represented by U.S. Pat. No. 5,669,131. It provides for an easy and comfortable transport by the pet owner of the pet carrier in either the open or collapsed relationships of the pet carrier. This is provided by coupling straps to clasps on the carrier in relationships to provide for a manual grasping of the straps to hold the carrier by hand at the owner's side in either the open or collapsed relationships of the carrier.

In other relationships of attachment to the pet carrier, the straps support the carrier on the owner's shoulders in the collapsed relationship of the carrier with the carrier disposed against the owner's side or back. The strap(s) can also be used as a leash for the pet when the strap(s) are detached from the clasps on the carrier and are attached to the pet collar of the pet. The carrier further provides for a reliable disposition of the carrier in either the open or collapsed relationship and for an easy and quick conversion of the carrier between the open and collapsed relationships.

In the preferred embodiment, a pet carrier expandable to hold a pet and collapsible to suitcase size includes a pair of platforms and first and second pairs of spaced walls. The walls in the first pair (e.g. front and rear) are pivotably attached at opposite ends to the platforms and are hinged at intermediate positions for collapsing or opening the carrier. The walls (e.g. side) in the second pair are pivotable toward an individual one of the platforms, with the platform as a fulcrum, to collapse the carrier and are pivotable toward the other platform to open the carrier. Resilient members at the bottom of the walls in the first pair releasably engage the walls in the second pair in the relationship for maintaining the carrier open. The resilient members are constrained to provide for a pivotal movement of the walls in the second pair to the carrier's open relationship.

Straps engage clasps on the top platform in different relationships to provide for a manual transport of the carrier by the pet owner with (a) the carrier opened or collapsed and disposed at the pet owner's side near the owner's knees, (b) the carrier collapsed and disposed at the owner's side near the chest and the straps disposed over one shoulder and (c) the carrier collapsed and disposed against the owner's back and the straps disposed over the owner's shoulders. The straps may be decoupled from the carrier clasps and may be used as a leash which is attached to a collar on the pet's neck. The straps may have handles at intermediate positions to provide comfort to the owner when the straps are disposed on the shoulder(s) or grasped by the owner's hand.

DETAILED DESCRIPTION OF THE PREFERRED EMBODIMENT

The preferred embodiment, generally indicated at 10, constitutes an improvement in certain important respects over the Animal Carrier disclosed and claimed in U.S. Pat. No. 5,669,331 issued on Sep. 23, 1997, to Edward Richmond and assigned of record to an assignee in which Edward Richmond is a major stockholder. Edward Richmond is also the inventor of the preferred embodiment of this invention and has assigned the invention to an assignee in which Edward Richmond is a major stockholder. If any inadequacy should be found in the disclosure in this application, reference should be made to the specification and drawings in U.S. Pat. No. 5,669,331 to complete such disclosure.

The pet carrier 10 is provided with an expanded or opened relation (FIG. 1) to hold a pet such as a dog and with a collapsed or closed relationship (FIG. 2) to facilitate the manual transport of the pet carrier when the pet carrier has the size of a briefcase. The pet carrier 10 includes a top platform 12 (FIGS. 1 and 2), a bottom platform 14 (FIGS. 1, 3 and 4), a front wall 16 (FIGS. 1 and 5), a rear wall 18 (FIG. 4), a wall 20 (FIGS. 1 and 6) on the left side and a wall 22 (FIG. 7) on the right side.

Preferably the platforms 12 and 14 and the walls 16, 18, 20 and 22 have rectangular configurations to provide, in the expanded or opened disposition of the housing 10, a space defined by six (6) peripheries each of rectangular configuration. The platforms 12 and 14 and the walls 16, 18, 20 and 22 may be formed from a suitable material such as a thermosetting plastic or a thermoplastic material or from a suitable material such as aluminum.

The platforms 12 and 14 may preferably be formed from a solid material. Each of the front and rear walls 16 and 18 may be provided with spaced ribs 24 (FIGS. 1 and 4) extending from one of the wall extremities to a hinge 26. The spaced ribs 24 provide for the flow of air through the pet carrier 10 in the opened relationship of the pet carrier. Each of the hinges 26 extends along the length of the associated wall at an intermediate position between the top and bottom of the wall. The upper and lower portions of each of the front and rear walls 16 and 18 are pivotable relative to each other on the hinges 26 as a fulcrum. Hinges 28 (FIG. 19) may also be provided at the bottom of the top platform 12 and at the top of the bottom platform 14.

The side wall 20 may preferably be formed from a grated material defined by a plurality of horizontally and vertically spaced wires. The grated material helps to decrease the weight of the pet carrier 10 and to provide for air circulation through the pet carrier. The side wall 22 may be formed from a solid material. Each of the side walls 20 and 22 may be pivotably coupled to the bottom of the top platform 12 for pivotal movement on a horizontal axis defined by the bottom of the top platform.

Figure 1:
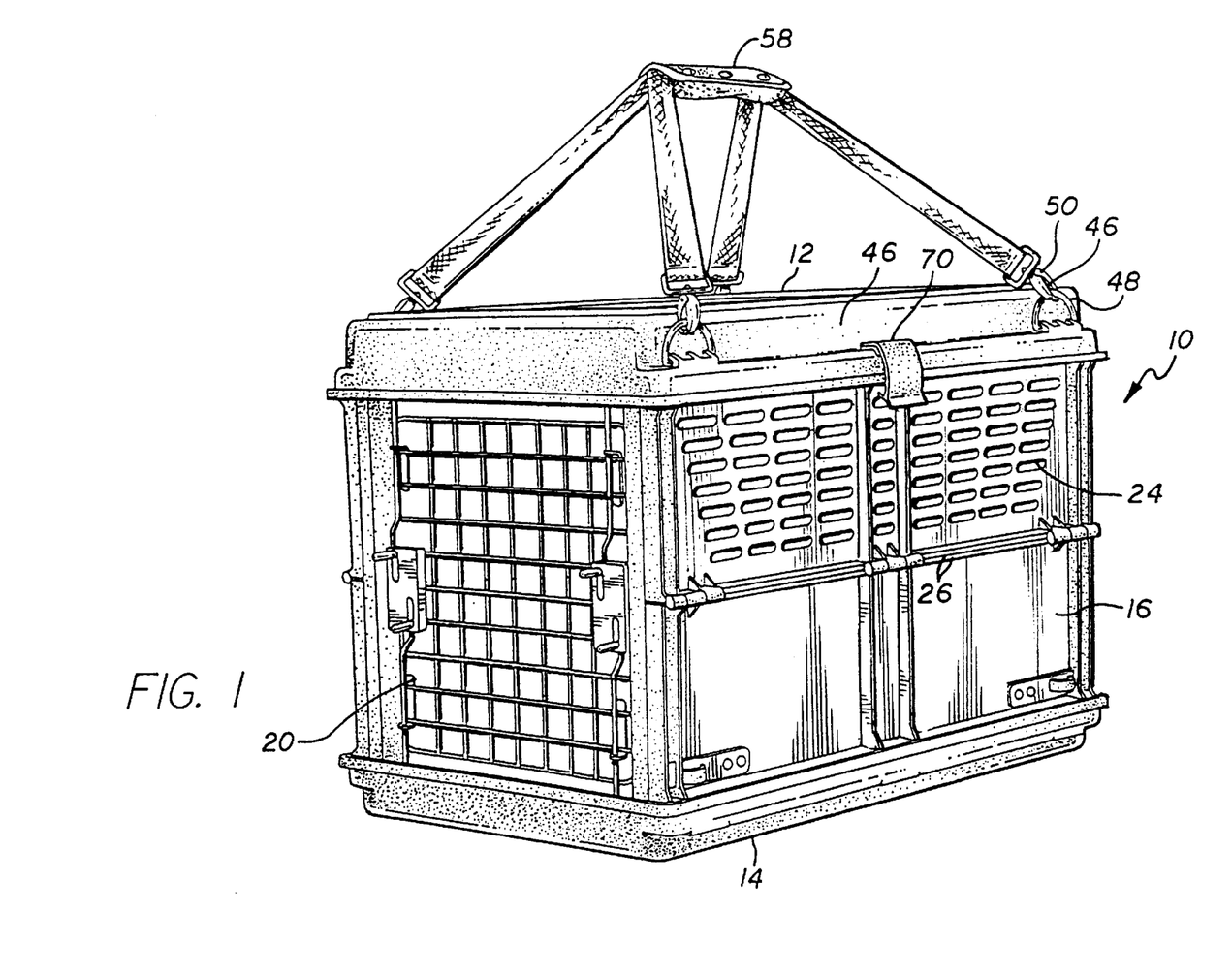
FIG. 1 is a perspective view of a collapsible pet carrier, as seen from a position in front and to the left of the pet carrier, with the pet carrier in the open relationship and with straps attached to clasps on a top platform of the pet carrier for manual transport of the pet carrier.
Figure 8:
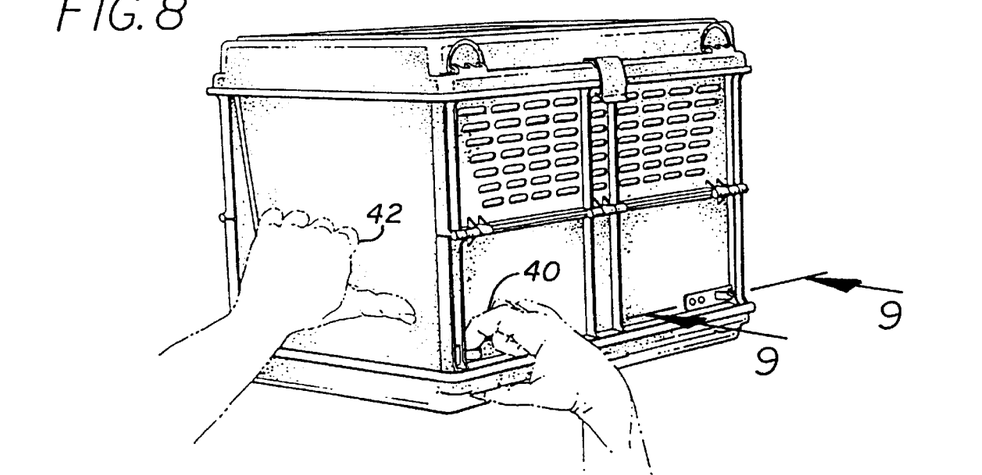
FIG. 8 is a perspective view of the pet carrier in the opened relationship and shows the gate almost fully opened and a manually operated detent mechanism on the front wall for retaining the gate in the opened relationship and further shows how the detent mechanism is manually operated, and how the gate is manually pivoted, to provide for the opening of the gate.
Figure 9:
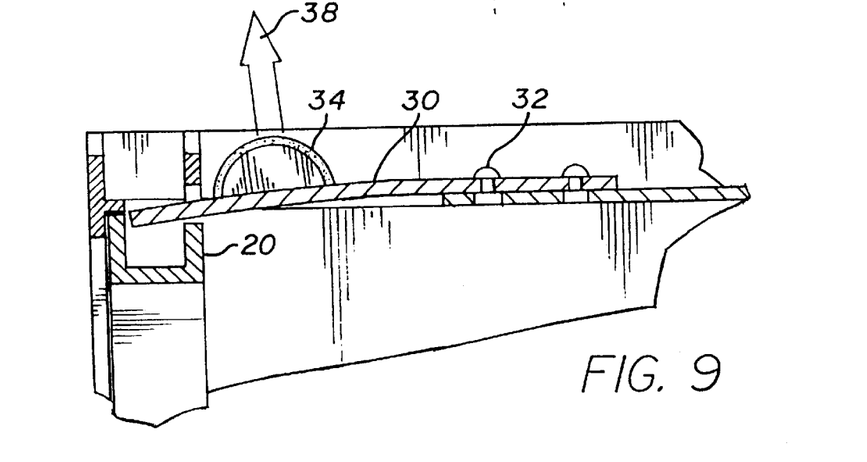
FIG. 9 is a sectional view taken substantially on the line 9—9 of FIG. 8 and shows the gate in the opened relationship and further shows the detent mechanism and the manual operation of the detent mechanism to release the gate for manual opening.

When the walls 20 and 22 have the hanging relationship shown in FIG. 1 for the wall 22, the walls 20 and 22 may have a releasably fixed relationship to the front and rear walls 16 and 18. This is shown schematically in FIGS. 8, 9 and 10. As shown in FIG. 9, resilient leaf springs 30 are attached as at 32 to the exterior surfaces of the front and rear walls 16 and 18 near the left and right extremities of the walls. The resilient leaf springs 30 extend at their free ends through openings in the walls into the interior of the pet carrier 10. Gripping members 34 having a semi-cylindrical shape are integral with the resilient leaf spring 30 near the free or resilient end of the leaf spring.

Figure 10:
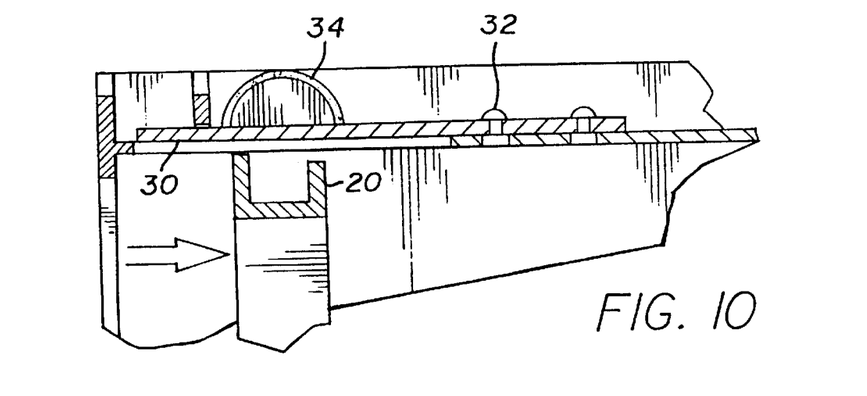
FIG. 10 is a sectional view similar to that shown in FIG. 9 and shows the gate in a partially collapsed relationship and shows the positioning of the detent mechanism with the gate in the partially collapsed relationship.

When the side walls 20 and 22 are pivoted to the positions for providing an opened relationship of the side walls as shown in FIG. 9, the free ends of the leaf springs 30 are disposed in a position relative to the side wall (e.g. 20) for preventing the side walls from being pivoted to the position for providing a closed relationship of the pet carrier 10. When it is desired to pivot the side wall (e.g. 20) to the position for providing the closure of the pet carrier 10, the leaf spring 30 is manually pivoted away from the side wall (e.g. 20) in a direction indicated by an arrow 38 in FIG. 9 so that the side wall is able to move past the free end of the leaf spring 30. This is shown in FIG. 10. The manual exertion of this force is indicated schematically by the disposition of the owner's right hand at 40 in FIG. 8. The side wall can then be pivoted manually past the free end of the leaf spring 30 as shown schematically by the disposition of the left hand 42 in FIG. 8. A hole 44 (FIGS. 7 and 8) may be provided in the side wall 20 to facilitate the pivotable movement manually of the side wall.

Figure 15:
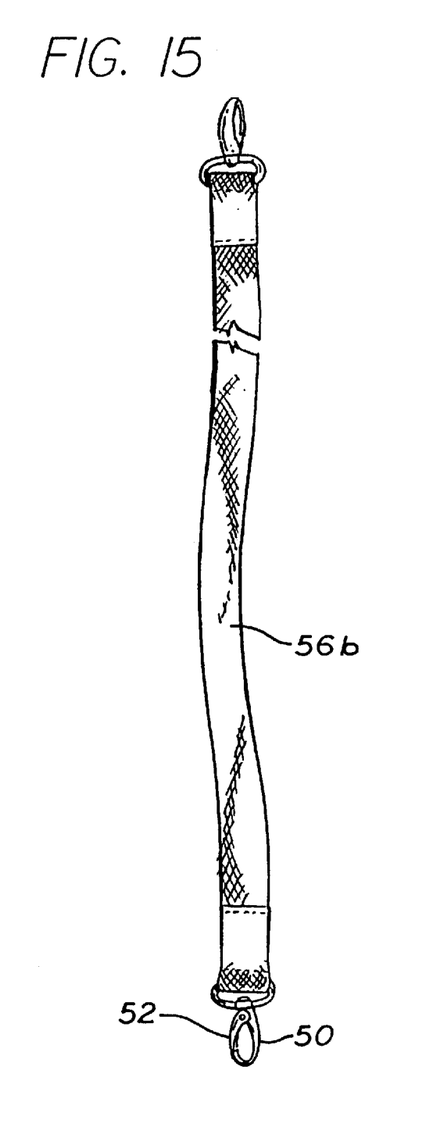
FIG. 15 is a perspective view of a first one of the straps.
Figure 16:
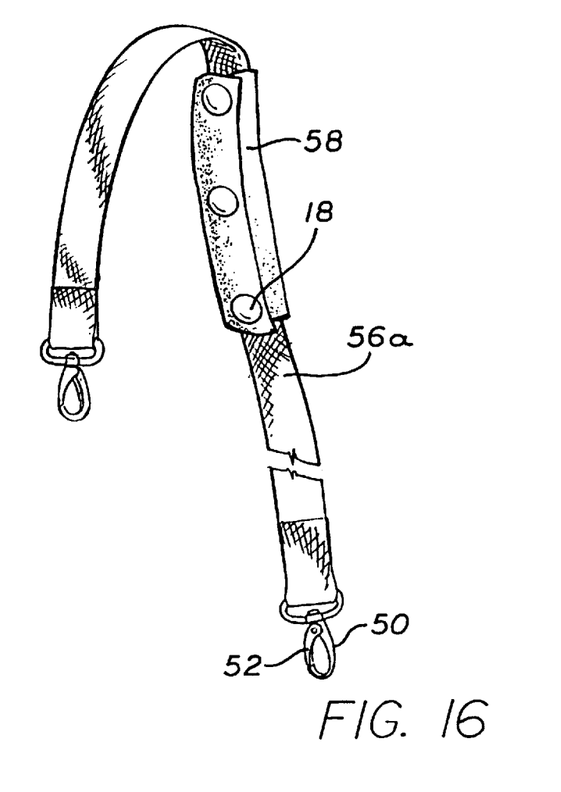
FIG. 16 is a perspective view of the other strap and shows a casing which is disposed in a closeable loop at an intermediate position along the length of the other strap and which is constructed to retain the first one of the straps in a coupled relationship at an intermediate position along the length of the first one of the straps.

The top platform 12 has a downwardly extending ledge portion 46 (FIGS. 1–3) on all four (4) sides of its periphery. Retaining members such as clasps 48 are disposed near the bottom of the four (4) corners of the ledge portion 46. The retaining members such as the clasps 48 provide a detent relationship with retainers 50 (FIGS. 1, 15 and 16) each of which has a spring loaded finger 52. Each of the retainers 50 forms a hollow closed loop or hollow ring for retaining one of the clasps in a coupled relationship when the finger 52 in the retainer is not manually constrained. Each of the retainers 50 provides an opening for receiving one of the clasps 48 in the coupled relationship, or for inserting the clasp into or for removing the clasp from, the coupled relationship when the finger 52 is manually constrained. The retainers 50 are disposed at the opposite ends of a pair of straps 56a and 56b.

The straps 56a and 56b are adapted to be coupled to the top platform 12 in different relationships dependent upon whether the pet carrier 10 is opened or collapsed. When the pet carrier 10 is opened, the strap 56a is coupled to the clasps 48 at the opposite ends of the platform adjacent the front wall 16 of the pet carrier 10 and the strap 56b is coupled to the clasps 48 at the opposite ends of the platform adjacent the rear wall 18 of the pet carrier. This is shown schematically in FIGS. 1 and 19. Alternatively, the straps 56a and 56b may be respectively disposed at the rear and front of the top platform 12.

A first end of a casing 58 may be attached to the strap 56a at an intermediate position along the length of the strap. The casing 58 may be made from a suitable material such as a soft leather or a soft plastic material. Male snaps 60 (FIGS. 17 and 18) may be disposed on the exterior surface of the casing portion 58. The casing 58 is adapted to be wrapped in a single loop around the strap 56a. At its second end, the inner surface of the casing 58 is provided with female snaps 62 (FIG. 17) which are constructed to mate with the male snaps 60 when the casing is wrapped in a single loop around the strap 56a at the intermediate position along the length of the strap.

The strap 56b may be disposed within the single loop of the casing 58 to fortify the strap 56 at the intermediate position and to provide for a common manual grasping of the straps 56a and 56b at the position of the casing 58. The loop defined by the casing 58 may be closed by engaging the snaps 60 and 62. This is advantageous when the pet carrier 10 is in the opened relationship and the pet carrier is manually carried by the pet owner as shown schematically in FIGS. 1 and 19. At such a time, the straps 56a and 56b are commonly gripped by the pet owner at the position of the casing 58 and the pet carrier is carried at the side of the pet owner.

Figure 12:
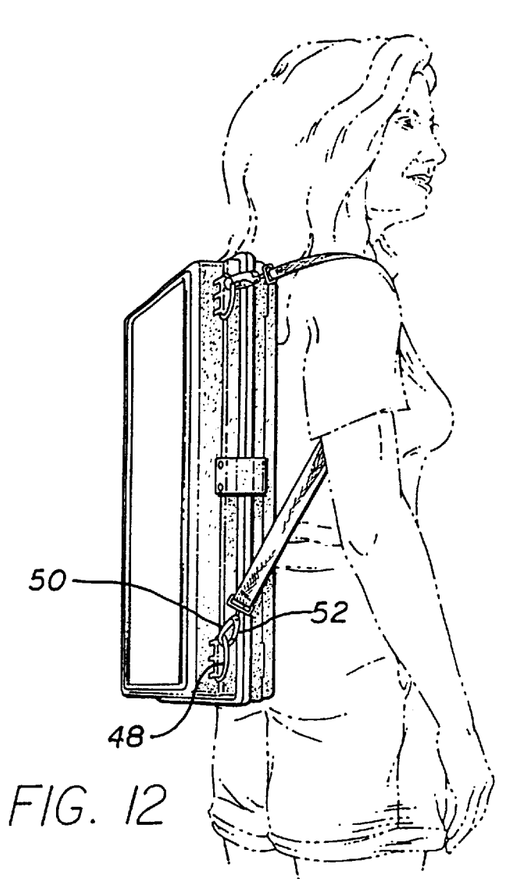
FIG. 12 is a perspective view of the pet carrier in the collapsed relationship and with the straps attached to the clasps on the top platform in a relationship to provide for a disposition of the straps over the shoulders of the pet owner and a disposition of the pet carrier against the back of the pet owner.

The strap 56a may also be coupled to the clasps 48 at the front end of the top platform 12, and the strap 56b may be coupled to the clasps 48 at the rear end of the top platform 12, when the pet carrier 10 is closed. This is shown schematically in FIG. 12. When this occurs, the collapsed pet carrier 10 is disposed against the back of the pet owner. Each of the straps 56a and 56b is disposed over an individual one of the shoulders of the pet owner and against an individual one of the sides of the pet owner. Each arm of the pet owner is then free to move in any direction without any constraint from the pet carrier 10 or from either of the straps 56a and 56b.

When the pet carrier is in the collapsed relationship, both of the straps 56a and 56b may be coupled to the clasps 48 at the front end of the top platform 12. The strap 56b may then be disposed within the loop defined by the casing 58 and the loop may be closed by engaging the snaps 60 and 62. The straps 56a and 56b may then be disposed over the shoulder of the pet owner and the pet carrier 10 may be disposed against the side of the pet owner. This is shown schematically in FIG. 11. As with the embodiment shown in FIG. 10 the arms of the pet owner are free to move in any direction. In this relationship, the casing 58 is disposed on the shoulder of the pet owner to enhance the comfort of the pet owner in transporting the pet carrier.

Figure 11:
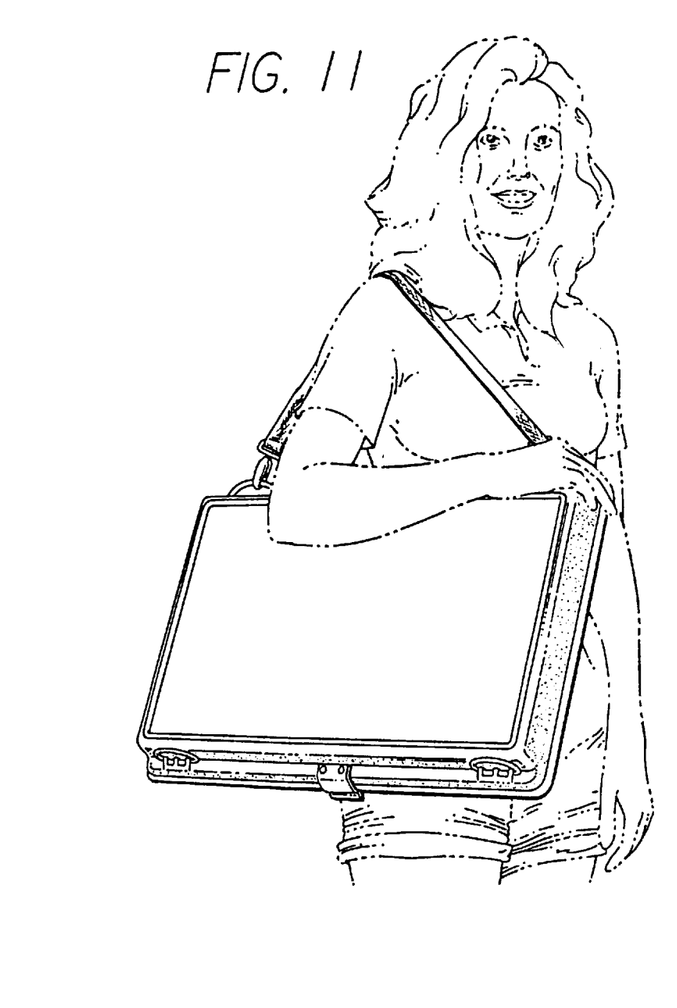
FIG. 11 is a perspective view of the pet carrier in the collapsed relationship, with straps attached to clasps on the top platform in a relationship to provide for a disposition of the strap(s) over a shoulder of the pet owner with the pet carrier resting against a side of the pet owner.

It will be appreciated that only one of the straps, preferably the strap 56a, may be coupled to the pet carrier 10 in the relationship shown in FIG. 11. It will also be appreciated that the straps 56a and 56b may be grasped by a hand of the pet owner when the straps have the relationship shown in FIG. 11 and the pet carrier has been collapsed. It will be further appreciated that only one of the straps, preferably the strap 56a, has to be coupled to the pet carrier 10 to provide for a support of the pet carrier when the pet carrier is collapsed and the strap is held in the hand of the pet owner.

Figures 13, 14:
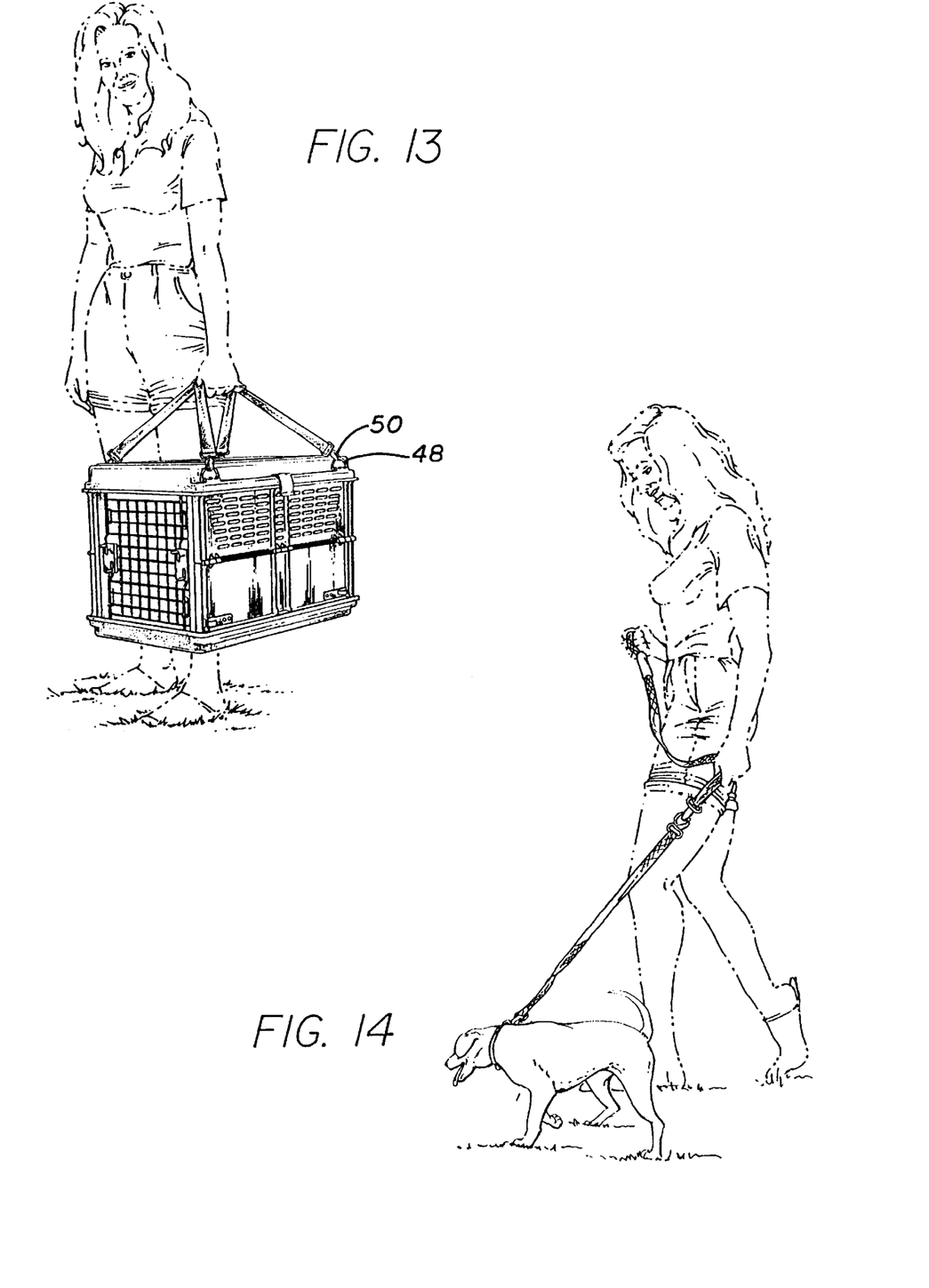
FIG. 13 is a view similar to that shown in FIG. 1 of the pet carrier in the opened relationship and shows the disposition of the straps in the clasps on the top platform to provide for the manual transport of the pet carrier by the pet owner with the pet carrier disposed at a side of the pet owner.
FIG. 14 is a perspective view of a pet owner and a pet and shows the straps detached from the pet carrier and serving as a leash for the pet.

FIG. 14 shows the use of the strap 56a or the strap 56b, or both the straps 56a and 56b disposed in a series relationship, as a dog leash. When only the single one of the straps 56a and 56b, preferably the strap 56a, is to be used as the leash, one of the retainers 50 on the strap is coupled to a clasp on a collar disposed on the pet's neck and the other end of the strap is held in the pet owner's hand. When both of the straps 56a and 56b are to be used in the leash, the retainer 50 at the first end of one of the straps is coupled to the collar on the pet's neck and the retainer at the other end of this strap is coupled to the retainer at one end of the other strap. This causes the two (2) straps to have a series relationship. The pet owner grasps the other end of the other strap.

It should be appreciated that one of the retainers 50 on the strap 56b may be coupled to the clasp on the pet collar and that the other retainer may be coupled to the retainers on the strap 56a. The casing 58 may then be manually grasped by the pet owner to walk the pet.

Figures 17, 18:
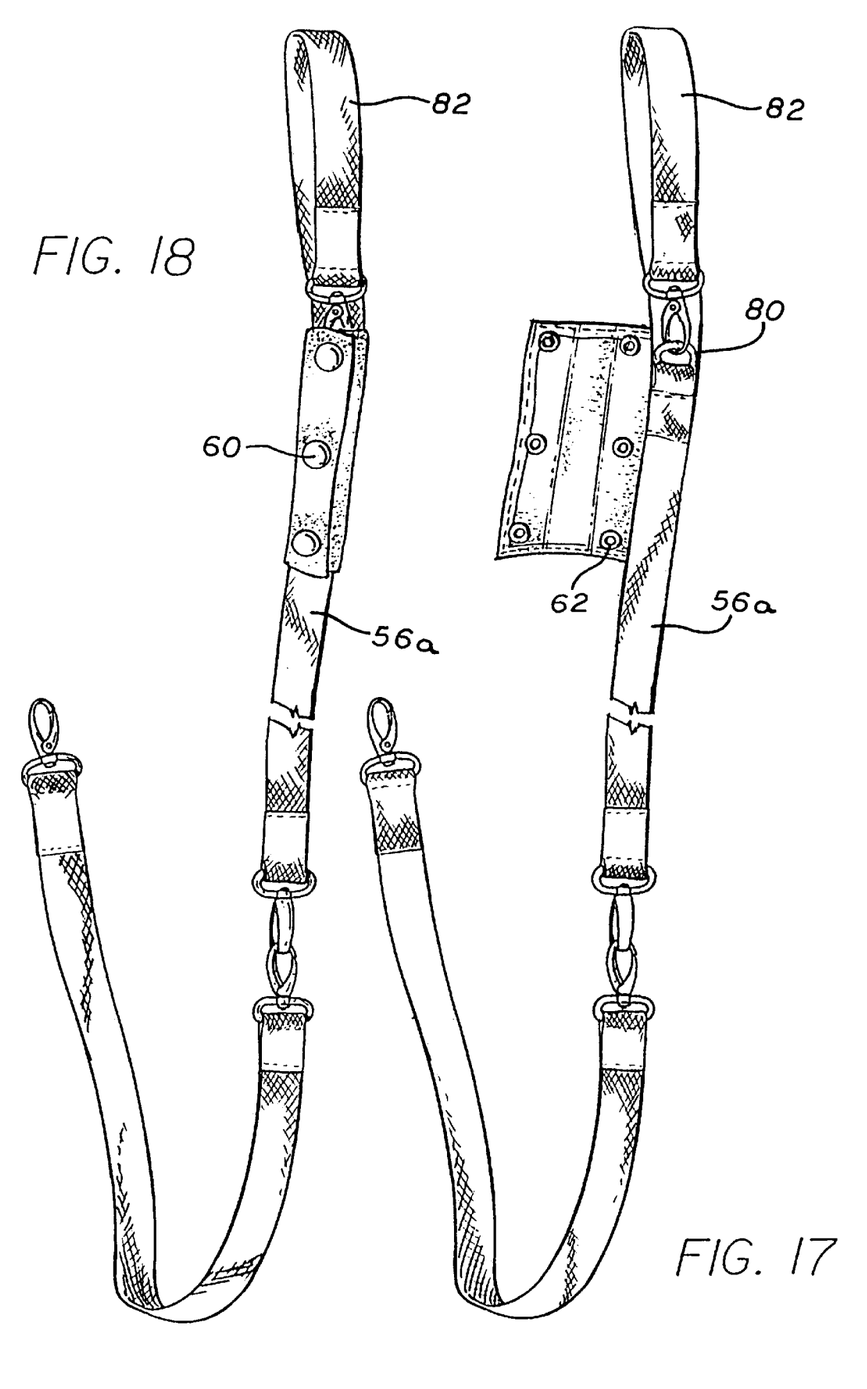
FIG. 17 is a perspective view of the other one of the straps with the casing in the opened relationship to receive the first one of the straps.
FIG. 18 is a perspective view of the other one of the straps with the casing in the closed relationship.

The strap 56a may be provided with a retaining member 80. One end of the strap 56a may then be folded upon itself to define a loop 82 as shown in FIGS. 17 and 18. The retainer 50 at the end of the loop 82 is then coupled to the retaining member 80. A pet owner may insert the pet owner's hand into the loop 82 as shown in FIG. 14 to firmly grasp the leash when the pet owner walks the pet owner's dog.

Figure 2:
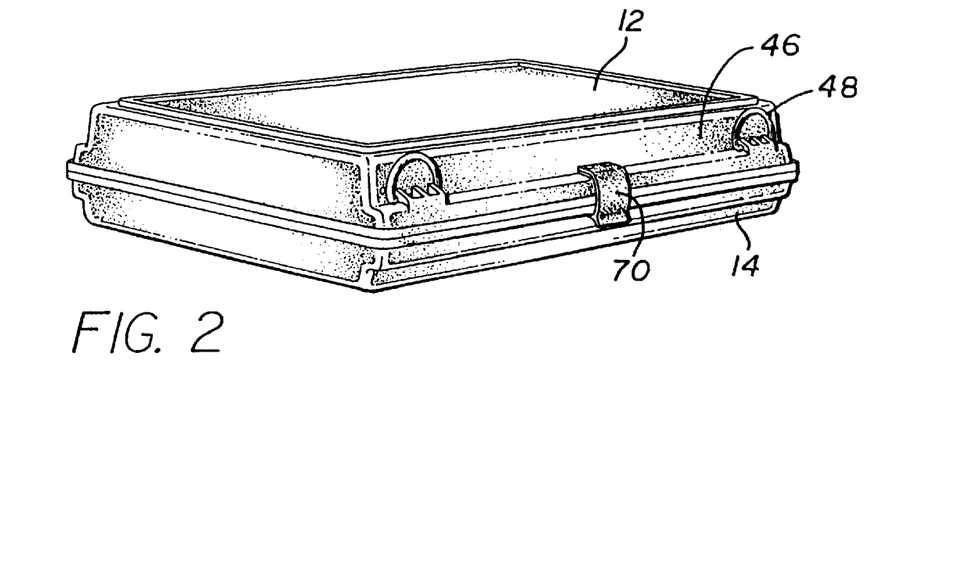
FIG. 2 is a perspective view of the pet carrier in a collapsed or briefcase relationship as seen from a position above and in front of, and to the left of, the pet carrier.
Figure 3:
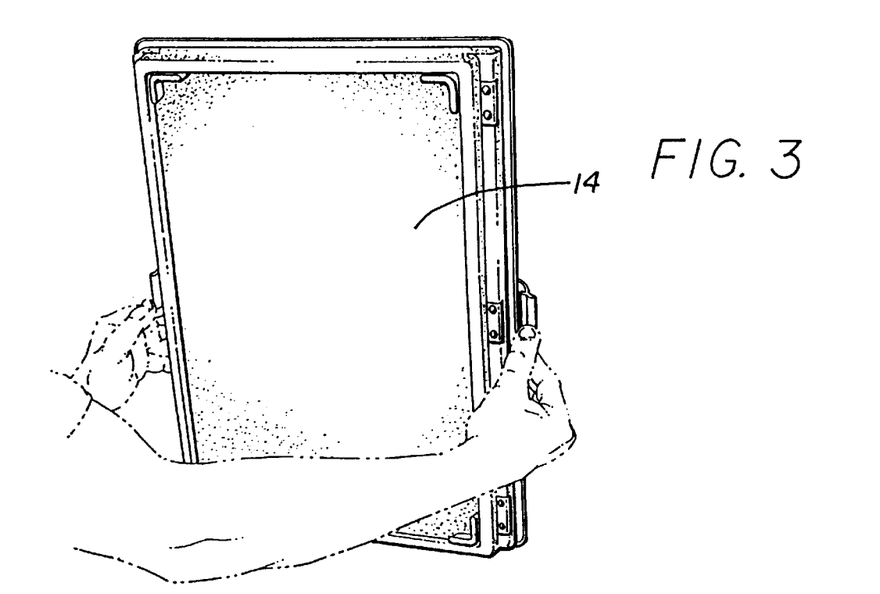
FIG. 3 is a perspective view of the pet carrier in the collapsed or briefcase relationship as seen from a position below, and slightly in front of, the pet carrier and shows clasps being manually operated at the front and back of the pet carrier to manually lock the pet carrier in the collapsed or briefcase relationship or to open the pet carrier.

FIG. 2 shows the pet carrier 10 in the collapsed relationship. The pet carrier 10 is maintained in this relationship by resiliently clamping members 70 (FIGS. 1–3) attached to the top platform 12 at the front and rear ends of the top platform. The released clamping members 70 have flanges which engage, as by a snap action, ledges 72 on the bottom platform 14 to retain the top and bottom platforms in contiguous relationship.

Figure 4:
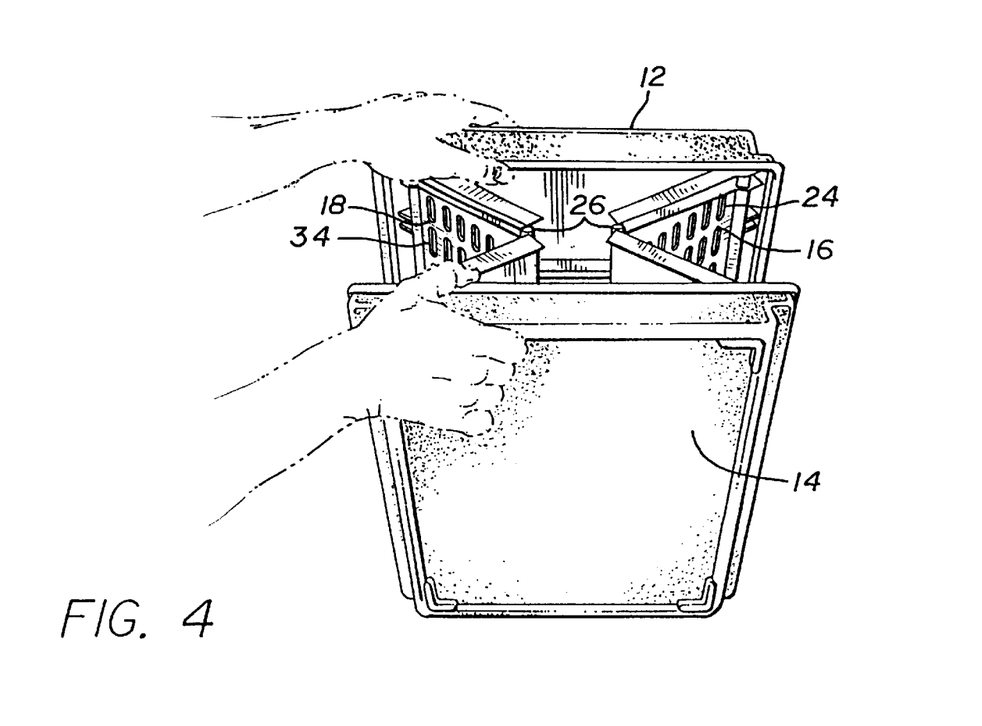
FIG. 4 is a perspective view of the pet carrier in a partially opened relationship as seen from a position below and to the left of the pet carrier.
Figure 5:
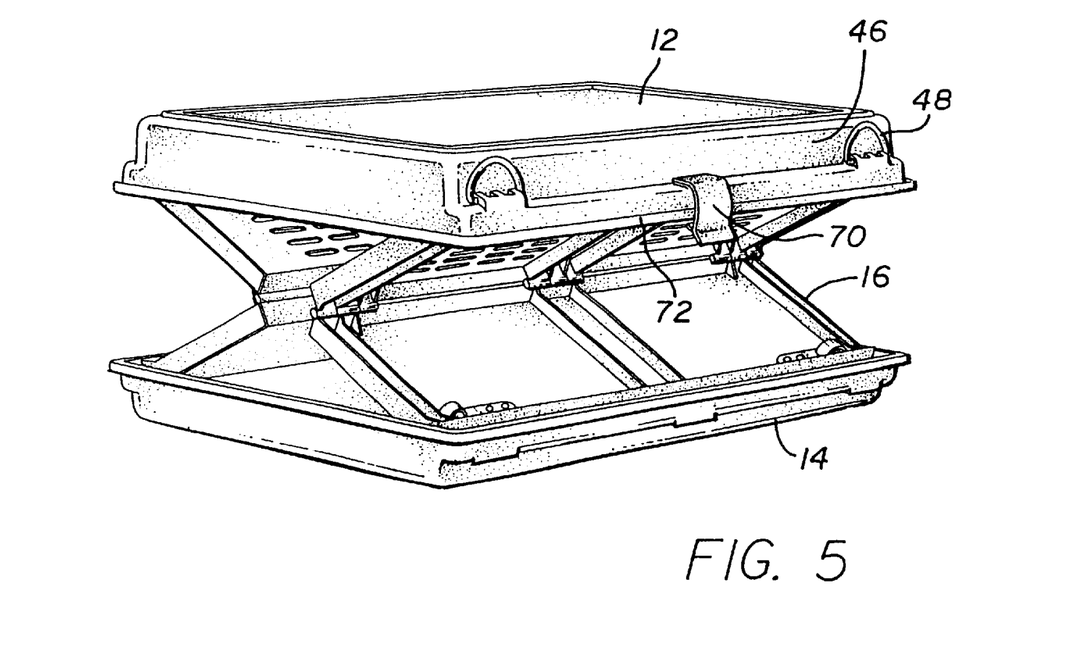
FIG. 5 is a perspective view of the pet carrier partially opened as seen from a position above, in front of and to the left of the pet carrier.
Figure 6:
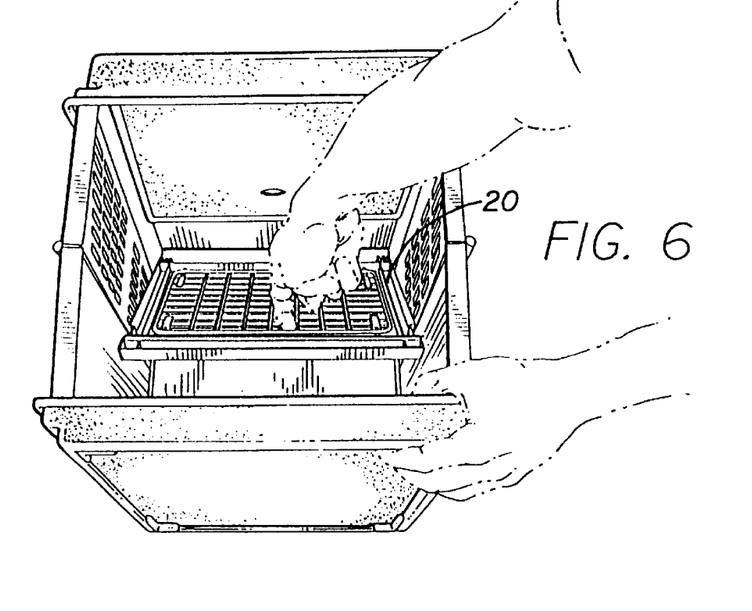
FIG. 6 is a perspective view of the pet carrier in an almost fully opened relationship as seen from a position below and to the left of the pet carrier and shows a pivotable door partially opened on the left side of the pet carrier.
Figure 7:
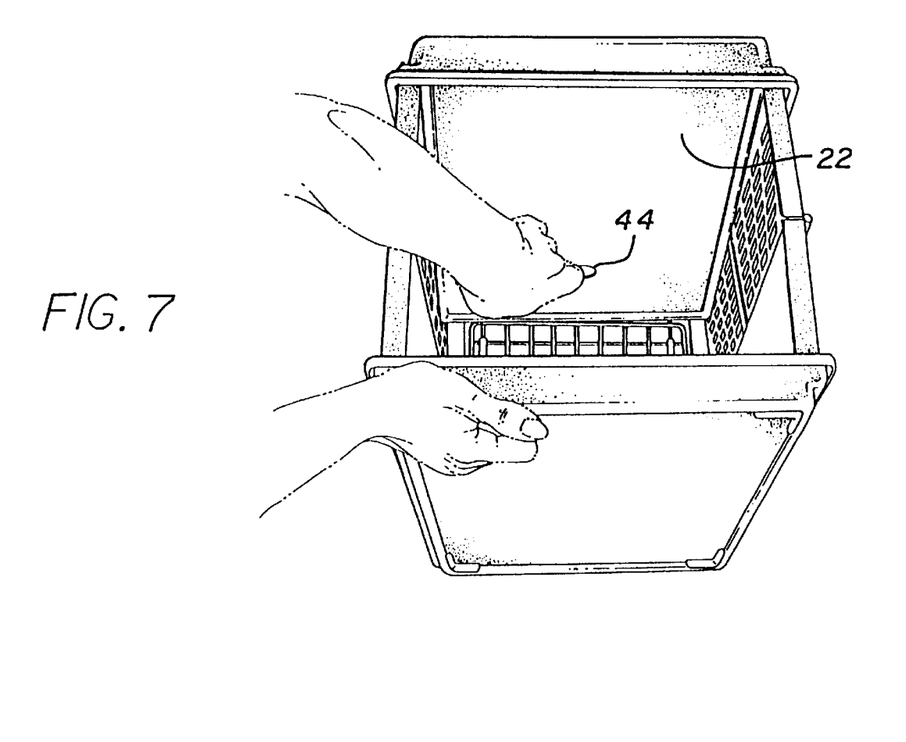
FIG. 7 is a perspective view of the pet carrier in an almost fully opened relationship as seen from a position below and to the right of the pet carrier and shows a pivotable gate partially opened on the right side of the pet carrier.
Figure 19:
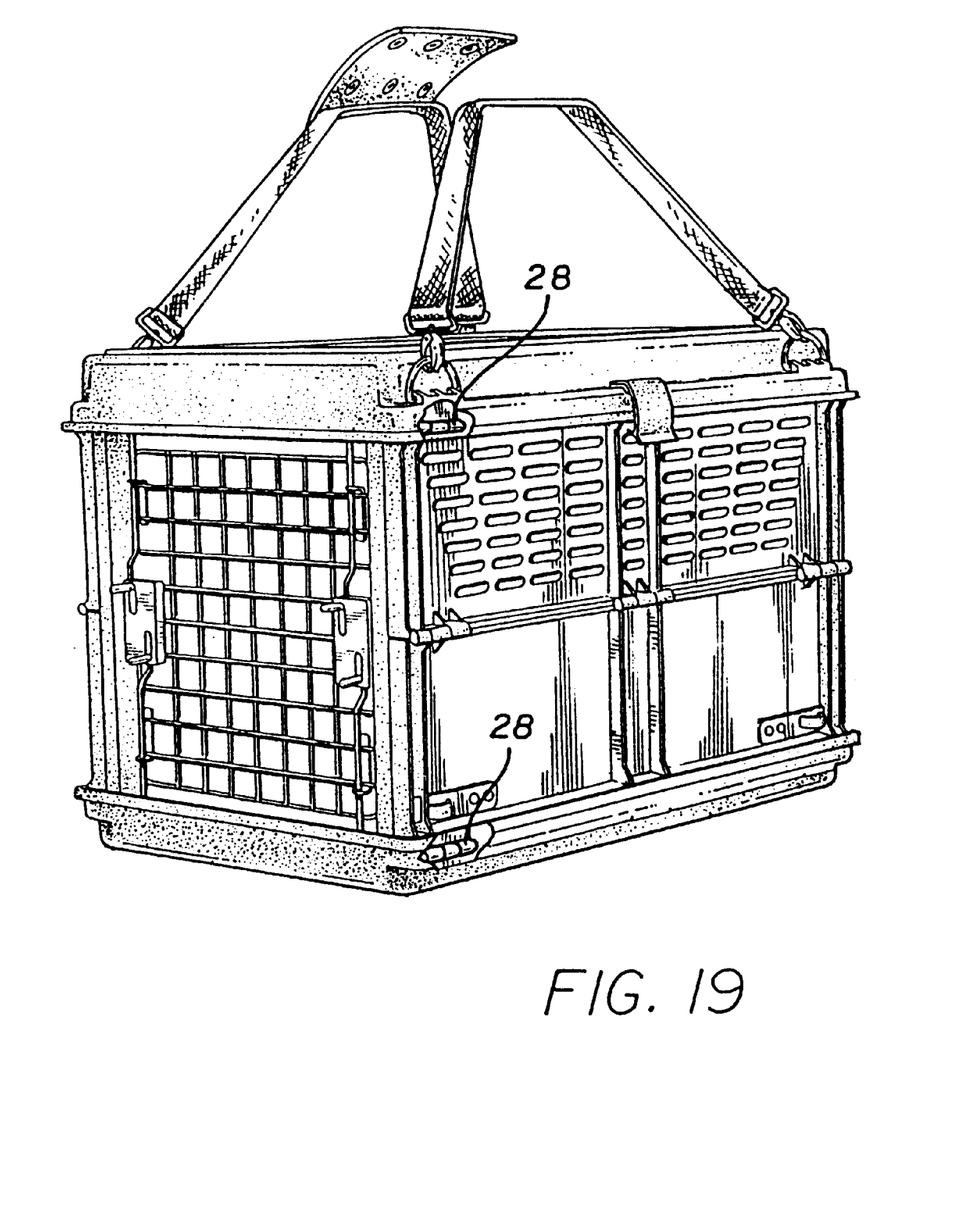
FIG. 19 is a perspective view of the pet carrier in the opened relationship and shows the straps attached to the pet carrier with the other one of the straps in the opened relationship to receive the first one of the straps and also shows hinges at the top and bottom of the pet carrier to facilitate the pivotable movement of the front and rear walls of the pet carrier between the opened and collapsed relationships.

When it is desired to open the pet carrier 10, the clamping members 70 are flexed outwardly to release the clamping members from the ledges 72. This is shown schematically in FIG. 3. The top platform 12 and the bottom platform are then moved outwardly from each other as shown schematically in FIG. 4. The platforms 12 and 14 are able to move outwardly from each other as a result of the pivotal action of the hinges 26 and 28 (FIG. 19). FIGS. 4 and 5 show the pet carrier 10 with the platforms 12 and 14 in a partially displaced relationship and FIGS. 6 and 7 show the platforms in a fully displaced relationship.

The side walls 20 and 22 are then pivoted in directions to define an enclosure for the pet carrier 10 in the open relationship of the pet carrier. This is shown schematically in FIGS. 6 and 7. The disposition of the side wall 20 in a partially pivoted relationship is shown schematically in FIG. 6 and the disposition of the side wall 22 in a partially pivoted relationship is shown schematically in FIG. 7. FIG. 8 shows the pet carrier 10 in a fully opened relationship with the side wall 22 almost fully pivoted from a fulcrum near the top of the pet carrier so that the side wall closes the pet carrier at the left end of the pet carrier. FIG. 9 shows how the front and rear walls 16 and 18 retain the side wall 20 in a locked relationship when the side wall has been pivoted to a vertical disposition relative to the top and bottom platforms 12 and 14. A similar locking relationship is provided between the side wall 22 and the front and rear walls 18 and 20.

When it is desired to collapse the pet carrier 10 from the fully opened relationship shown in FIG. 1 to the suitcase relationship shown in FIG. 2, the gripping members 34 are manually moved outwardly (upwardly in FIG. 9 as indicated by the hollow arrow 38) to the position shown in FIG. 10. This allows the side walls 20 and 22 to clear the free ends of the leaf springs 30 as the side walls are pivoted upwardly against the bottom surface of the top platform 12. The top and bottom platforms 12 and 14 can then be collapsed toward each other and the platforms can then be retained in the collapsed relationship by pivoting the clamping members 70 into the ledges 72.

The pet carrier 10 has certain important advantages. It provides a quick and easy transition of the pet carrier between the opened (as shown in FIG. 1) and collapsed (as shown in FIG. 2) relationships. It also provides for a number of different modes of manual transport of the pet carrier 10, particularly when the pet carrier is in the collapsed relationship shown in FIG. 2. This is provided by the different modes of coupling the straps 56a and 56b to the pet carrier as shown schematically in FIGS. 1, 11, 12, 13 and 19. The pet carrier 10 is further advantageous in that the pet carrier 10 provides for a secure retention of the straps 56a and 56b on the pet carrier until such time as it is desired to use the strap(s) as a leash for the pet. The pet carrier 10 is also advantageous in that the strap(s) 56a and 56b can be used as a leash in walking the pet carrier.

Although this invention has been disclosed and illustrated with reference to particular embodiments, the principles involved are susceptible for use in numerous other embodiments which will be apparent to persons of ordinary skill in the art. The invention is, therefore, to be limited only as indicated by the scope of the appended claims.

What is claimed is:

1. A portable pet carrier for providing a manual transport of the pet carrier by a pet owner, including, top and bottom platforms defining the top and bottom of the pet housing, front and rear collapsible walls each having opposite ends respectively attached pivotably to the top and bottom platforms and hinged at an intermediate position between the opposite ends to provide for a pivotable collapse of such walls against the top and bottom platforms for portable transport of the pet carrier in a collapsed relationship and to provide for an expansion of the front and rear walls for use in housing the pet and in providing for a transport of the pet carrier, left and right side walls each pivotably attached to an individual one of the top and bottom platforms to facilitate the collapse of the front and rear walls when such side wall is pivoted toward the individual one of the top and bottom platforms, retaining members disposed at opposite ends of the top platform, and a pair of straps each having retainers at the opposite ends of the straps to provide for the attachment of each of the retainers to an individual one of the retaining members for a transport of the opened portable pet housing by the pet owner at the side of the pet owner and for a transport of the collapsed portable pet carrier by the pet owner on the back, shoulder or side of the pet owner.

2. A portable pet carrier as set forth in claim 1, including, the retainers of each of the straps being attachable at their opposite ends to the retaining members at an individual one of the front and rear of the top platform to provide for the transport of the collapsed portable carrier with at least one of the straps disposed over one of the shoulders of the pet owner.

3. A portable pet carrier as set forth in claim 2 wherein the retaining members at the opposite ends of the front and rear of the top platform constitute hollow clasps and wherein each of the retainers is formed from two portions constrainable relative to each other to define a hollow ring and wherein the two portions are movable relative to each other to provide for a retention of the clasp by one of the retainers or a removal of the clasps from the retaining members.

4. A portable carrier as set forth in claim 2 wherein a casing is disposed at an intermediate position on a first one of the straps and is provided with opened and closed relationships and is operative in the opened relationship to receive the other one of the straps at an intermediate position in the other one of the straps and is operative in the closed relationship to retain the intermediate positions in the first one of the straps and the other one of the straps in a coupled relationship with the retainers attached to the retaining members for a transport of the opened portable pet housing by the pet owner at the side of the pet owner in an individual one of the following relationships: (a) with the retainers attached to the retaining members on the individual one of the front and rear of the top platform and the pet carrier disposed against the back of the pet owner, (b) with the at least one of the straps disposed over one of shoulders of the pet owner and the pet carrier at the side of the pet owner and (c) with at least one of the straps manually grasped and the pet carrier at the side of the pet owner.

5. A portable pet carrier as set forth in claim 1 wherein the retainers at the opposite ends of each of the straps are attachable to the retaining members at the opposite ends of one of the front and rear of the top platform with the portable pet carrier in the opened relationship to provide for the transport of the opened portable pet housing by the pet owner at the side of the pet owner and with the portable pet carrier in the collapsed relationship to provide for the transport of the collapsed portable pet housing by the pet owner on the back of the pet owner with the straps extending over the shoulders of the pet owner or at the side of the pet carrier.

6. A portable pet carrier as set forth in claim 1 wherein the retaining members at the opposite ends of the front and rear collapsible walls constitute hollow clasps and wherein each of the clasps is formed from two portions constrainable relative to each other to define a hollow ring and wherein the two portions are movable relative to each other to provide for a retention of the clasp by one of the retaining members or a removal of the retaining member from the clasp.

7. A portable pet carrier as set forth in claim 1 wherein a casing is disposed at an intermediate position on a first one of the straps and is provided with opened and closed relationships and is operative in the opened relationship to receive the other one of the straps at an intermediate position in the other one of the straps and is operative in the closed relationship to retain the other one of the straps at the intermediate position in the first one of the straps and in the other one of the straps in a coupled relationship with the clasps attached to the retaining members for a transport of the opened portable pet carrier by the pet owner at the side of the pet owner.

8. A portable pet carrier for providing a manual transport of the pet carrier by a pet owner, including,
    a first pair of spaced walls hinged at an intermediate position to provide collapsed and expanded relationships of such walls,
    a second pair of spaced walls disposed in a transverse relationship to the first pair of walls to define an enclosure with the first pair of walls,
    a pair of platforms disposed in a transverse relationship to the first and second pairs of spaced walls to cover the enclosure defined by the first and second pairs of spaced walls, the pair of platforms being pivotably coupled to the first pair of walls to provide for a pivotable collapse and expansion of the first pair of walls and an individual one of the platforms being pivotably coupled to the second pair of walls to provide for a pivotal movement of the second pair of walls between positions adjacent to and displaced from the individual one of the platforms,
    a plurality of retaining members disposed at spaced positions on one of the platforms, and
    a pair of straps each having retainers which are disposed at opposite ends of the strap and which are constructed to be coupled to the retaining members in relationships (a) to provide for a transport of the portable carriers in an opened relationship with the straps manually grasped by the pet owner and with the pet carrier disposed against one of the sides of the pet owner, (b) to provide for a transport of the portable carrier in the collapsed relationship with the straps extending over the shoulders of the pet owner and with the collapsed portable carrier disposed against the back of the pet owner, (c) to provide for a transport of the portable carrier in the collapsed relationship with the at least one of straps extending over one of the shoulders of the pet owner and with the pet carrier disposed against one of the sides of the pet owner and (d) to provide for a transport of the portable carrier in the collapsed relationship with the strap(s) manually grasped by the pet owner and with the pet carrier disposed against one of the sides of the pet carrier.

9. A portable pet carrier as set forth in claim 8 wherein the retaining members constitute hollow clasps disposed on one of the platforms and wherein
the retainers constitute hollow rings which have open and closed relationships and which are constrained to the closed relationship and which are manually operable against the constraint to the open relationship for coupling of the rings to the clasps or for removal of the rings from the clasps.

10. A portable carrier as set forth in claim 9 wherein one of the straps has a casing at an intermediate position for coupling the straps at the intermediate positions when the straps are retained by the retaining members to provide for the transport of the portable pet carrier by the pet owner and wherein
the casing is constructed to facilitate the pet owner's comfort in manually gripping the casing during the transport of the pet carrier in the opened and collapsed relationships and to facilitate the pet owner's comfort by disposition of the casing member on at least one of the pet owner's shoulders during the transport of the pet carrier in the collapsed relationship.

11. A portable pet carrier as set forth in claim 8 wherein one of the straps has a casing at an intermediate position for coupling the straps at the intermediate positions when the straps are retained by the retaining members to provide for the transport of the portable pet carrier by the pet owner.

12. A portable carrier as set forth in claim 11 wherein the casing member is constructed to facilitate the pet owner's comfort in manually gripping the casing during the transport of the pet carrier in the opened and collapsed relationships and to facilitate the pet owner's comfort by disposition of the casing on at least one of the pet owner's shoulders during the transport of the pet carrier in the collapsed relationship.

13. A portable pet carrier as set forth in claim 11 wherein the casing has opened and closed relationships and wherein the casing has the opened relationship when the straps are displaced from each other at the intermediate position and wherein
the casing is operable to the closed relationship to retain the straps in a coupled relationship at the intermediate position.

14. A portable pet carrier for providing a manual transport of the pet carrier by a pet owner in opened and collapsed relationships of the pet carrier, including,
    top and bottom platforms defining the top and bottom of the pet housing, the top platform having extremities,
    front and rear collapsible walls each having opposite ends respectively attached pivotably to the top and bottom platforms and each hinged at an intermediate position between the opposite ends to provide for a pivotable collapse of such walls against the top and bottom platforms for a portable transport by the pet owner of the pet carrier in the collapsed relationship and to provide for an expansion of the front and rear walls for a portable transport by the pet owner of the pet carrier in the opened relationship,
    left and right side walls each pivotably attached to an individual one of the top and bottom platforms to facilitate the collapse of the pet carrier when the side wall is pivoted toward the individual one of the top and bottom platforms and to facilitate the opening of the pet carrier when the side wall is pivoted toward the other one of the top and bottom platforms, clasps on the top platform near the extremities of the top platform, and straps constructed for coupling to the clasps in relationships to provide for a manual transport by the pet owner of the pet carrier in the opened and collapsed relationships of the pet carrier with at least one of the straps supporting the weight of the pet carrier.

15. A portable pet carrier as set forth in claim 14 wherein the straps are constructed, and the clasps are disposed on the top platform, for coupling to the clasps to provide for a disposition of the pet carrier at a side of the pet carrier in the opened and collapsed relationships of the pet carrier and to provide for a disposition of the pet carrier on the back of the pet owner in the collapsed relationship of the pet carrier.

16. A portable pet carrier as set forth in claim 15 wherein at least one of the straps is are constructed, and the clasps are disposed on the top platform, for coupling to the clasps to provide for a retention of the at least one of the straps in a hand of the pet owner with the disposition of the pet carrier at the side of the pet owner in the opened and collapsed relationships of the pet carrier and to provide for the disposition of the at least one of the straps on a shoulder of the pet owner and with the pet carrier in the collapsed relationship.

17. A portable pet carrier as set forth in claim 14 wherein the straps are disposed over the shoulders of the pet owner with the pet carrier in the collapsed relationship and the pet carrier disposed against the back of the pet owner.

18. A portable pet carrier as set forth in claim 14 wherein at least one of the straps are constructed to serve as a leash for the pet when the strap is decoupled from the pet carrier and are coupled to a collar on the pet.

19. A portable pet carrier as set forth in claim 14, including, spring members disposed on the front and rear collapsible walls and having free ends with constrained and unconstrained relationships and disposed in the unconstrained relationship relative to the side walls to prevent the side walls from being pivoted to the position for providing for a collapse of the top and bottom platforms of the top and bottom platforms and disposed in the constrained relationship relative to the side walls to provide for the pivotable movement of the side walls to the position for providing for the collapse of the top and bottom platforms to the contiguous relationship of the top and bottom platforms.

20. In combination, a portable pet carrier constructed to provide collapsed and expanded relationships and having top and bottom platforms and collapsible side walls including:

first and second straps, retaining members positioned on the pet carrier, retainers disposed at the opposite ends of each of the straps for removable coupling to the retaining members on the portable pet carrier to provide for a manual transport by the pet owner of the pet carrier in the collapsed and expanded relationships of the pet carrier, the retainers being coupled to the retaining members in individual ones of a plurality of relationships to provide for a suspension of the pet carrier at different times on the back of the pet owner or at the side of the pet owner with the straps manually gripped by the pet owner or from the shoulder of the pet owner, the retainers also being constructed to be coupled at one end to a collar on the pet owner's pet, and a casing disposed on the first strap at an intermediate position on the first strap and having opened and closed relationships and operative in the opened relationship to provide a decoupled relationship between the first and second straps and operative in the closed relationship at the intermediate position on the first strap to retain the first strap and the second strap in the coupled relationship at the intermediate position on the first strap for facilitating the transport by the pet owner of the pet carrier in the collapsed and opened relationships.

21. Apparatus for use with a portable pet carrier for providing for a manual transport of the pet carrier by a pet owner, the portable pet carrier constructed to provide collapsed and expanded relationships and having top and bottom platforms and collapsible side walls including retaining members on the pet, including:

first and second straps, retainers disposed at the opposite ends of each of the straps for removable coupling to the retaining members on the portable pet carrier to provide for a manual transport by the pet owner of the pet carrier in the collapsed and expanded relationships of the pet carrier, the retainers also being constructed to be coupled at one end to a collar on the pet owner's pet, and a casing disposed on the first strap at an intermediate position on the first strap and having opened and closed relationships and operative in the opened relationship to provide a decoupled relationship between the first and second straps and operative in the closed relationship at the intermediate position on the first strap to retain the first strap and the second strap in the coupled relationship at the intermediate position on the first strap for facilitating the transport by the pet owner of the pet carrier in the collapsed and opened relationships wherein a retaining member is disposed on the first strap for coupling to one of the retainers on the first strap to form a loop for receiving a hand of the pet owner when the pet owner couples the other retainer on the first strap to a collar on the pet for providing a movement of the pet with the pet owner.

22. Apparatus for use with a portable pet carrier for providing for a manual transport of the pet carrier by a pet owner, the portable pet carrier being constructed to provide collapsed and opened relationships and having top and bottom platforms and collapsible side walls and having retainer members on one of the platforms, the apparatus including:

first and second straps, retainers at the opposite ends of the first strap for coupling to first particular ones of the retaining members on the portable pet carrier, retainers at the opposite ends of the second strap for coupling to second particular ones of the retaining members on the portable pet carrier to provide for a cooperation between the first and second straps in obtaining a manual transport by the pet owner of the pet carrier in the collapsed and opened relationship of the pet carrier, each of the retainers also being constructed to be coupled to a collar on the pet owner's pet, an additional retaining member on the first strap, the retainers on the first strap also being constructed to provide for a coupling of one of the retainers on the first strap to the additional retaining member on the first strap to form a loop for receiving a hand of the pet owner when the pet owner couples the other one of the retainers on the first strap to the collar on the pet for providing a movement of the pet with the pet owner.

23. Apparatus as set forth in claim 22 wherein a casing is disposed on the first strap at an intermediate position on the first strap and is provided with open and closed relationships and is operative in the open relationship to decouple the second strap from the first strap and is operative in the closed relationship to retain the second strap in coupled relationship be the first strap and wherein the casing is constructed to provide a grip for the pet owner when the pet owner transports the pet carrier at the owner's side in the open relationship of the pet carrier and to provide a shoulder pad for the pet owner when the pet owner transports the pet carrier in the collapsed relationship on a shoulder of the pet owner.

24. A portable pet carrier for providing a manual transport of the pet carrier by a pet owner in opened and collapsed relationships of the pet carrier, including, top and bottom platforms defining the top and bottom of the pet housing, front and rear collapsible walls each having opposite ends respectively attached pivotably to the top and bottom platforms and each hinged at an intermediate position between the opposite ends to provide for a pivotable collapse of such walls against the top and bottom platforms for a portable transport by the pet owner of the pet carrier in the collapsed relationship and to provide for an expansion of the front and rear walls for a portable transport by the pet owner of the pet carrier in the opened relationship, left and right side walls each pivotably attached to an individual one of the top and bottom platforms to facilitate the collapse of the pet carrier when the side wall is pivoted toward the individual one of the top and bottom platforms and to facilitate the opening of the pet carrier when the side wall is pivoted toward the other one of the top and bottom platforms, and spring members disposed on the front and rear collapsible walls and having free ends with constrained and unconstrained relationships and disposed in the unconstrained relationship relative to the side walls to prevent the side walls from being pivoted to the position for providing for a collapse of the top and bottom platforms to a contiguous relationship and disposed in the constrained relationship relative to the side walls to provide for the pivotal movement of the side walls to the position for providing for the collapse of the top and bottom platforms to the contiguous relationship wherein the top platform has retaining members and wherein straps are constructed for coupling to the retaining members in relationships to provide for a manual transport by the pet owner of the pet carrier in the opened and collapsed relationships of the pet carrier with at least one of the straps supporting the weight of the pet carrier.

25. A portable pet carrier as set forth in claim 24 wherein the straps are constructed for coupling to the retaining members to provide for a disposition of the pet carrier at a side of the pet owner in the opened and collapsed relationships of the pet carrier and to provide for a disposition of the pet carrier on the back of the pet owner in the collapsed relationship of the pet carrier.

26. A portable pet carrier as set forth in claim 25 wherein at least one of the straps is constructed for coupling to the retaining members to provide for a gripping of the at least one of the straps by a hand of the pet owner with the disposition of the pet carrier at the side of the pet owner in the collapsed relationship of the pet carrier and to provide for the disposition of the at least one of the straps on a shoulder of the pet owner with the disposition of the pet carrier at the side of the pet owner in the collapsed relationship of the pet carrier.

27. A portable pet carrier as set forth in claim 26 wherein the straps are constructed to serve as a leash for the pet when the straps are decoupled from the pet carrier and are coupled to a collar on the pet.

* * * * *

UNITED STATES PATENT AND TRADEMARK OFFICE
CERTIFICATE OF CORRECTION

PATENT NO.    : 6,345,591 B1                                           Page 1 of 1
DATED         : February 12, 2002
INVENTOR(S)   : Edward A. Richmond It is certified that error appears in the above-identified patent and that said Letters Patent is hereby corrected as shown below:

Column 8,
Line 46, delete "with", add -- and wherein --.
Line 47, after "retainers", add -- are --.

Column 9,
Line 60, before "straps", add -- the --.
Line 65, delete "strap (s)", add -- at least one of the straps --.

Column 11,
Line 17, delete "are".
Line 31, delete "are", add -- is --.
Line 33, delete "are", add -- is --.

Signed and Sealed this

Fifth Day of November, 2002

Attest:

JAMES E. ROGAN
Attesting Officer          Director of the United States Patent and Trademark Office

UNITED STATES PATENT AND TRADEMARK OFFICE
CERTIFICATE OF CORRECTION

PATENT NO. : 6,345,591 B1
DATED : February 12, 2002
INVENTOR(S) : Edward A. Richmond It is certified that error appears in the above-identified patent and that said Letters Patent is hereby corrected as shown below:

<u>Column 8,</u>
Line 48, delete "opened".
Line 49, delete "at the side of the pet owner".

Signed and Sealed this

Twentieth Day of April, 2004

JON W. DUDAS
*Acting Director of the United States Patent and Trademark Office*